United States Patent [19]

Beyer et al.

[11] Patent Number: 5,326,073
[45] Date of Patent: Jul. 5, 1994

[54] VALVE WITH CYLINDRICAL METERING DEVICE

[75] Inventors: Kenneth E. Beyer, West Hartford; Wilhelm H. Horlacher, Newington, both of Conn.

[73] Assignee: Honeywell Inc., Minneapolis, Minn.

[21] Appl. No.: 90,353

[22] Filed: Jul. 12, 1993

[51] Int. Cl.⁵ .............................................. F16K 5/10
[52] U.S. Cl. .................. 251/209; 251/249.5; 251/310; 251/121
[58] Field of Search ............ 251/209, 310, 208, 249.5, 251/121; 137/501

[56] References Cited

U.S. PATENT DOCUMENTS

| | | | |
|---|---|---|---|
| 955,390 | 4/1910 | Denegre | 251/310 X |
| 1,138,613 | 5/1915 | Arndt | 251/310 |
| 1,931,048 | 10/1933 | Wiener | 251/249.5 X |
| 2,105,331 | 1/1938 | Rasmussen | 251/310 X |
| 4,150,692 | 4/1979 | Wolf | 251/208 X |
| 4,377,183 | 3/1983 | Johansson et al. | 251/209 X |

Primary Examiner—Arnold Rosenthal
Attorney, Agent, or Firm—William D. Lanyi

[57] ABSTRACT

A valve is provided with a throttle member that is capable of metering the flow between a bore channel of the valve and a port extending between the channel and an external location. The throttle member, or metering device, is a partial cylinder formed to include a plurality of deformations in its surface. The deformations can be slots that are shaped to receive a thread of a rotatable threaded member also attached to the valve body of the valve. Rotation of the threaded member can be arranged to cause the throttle member to rotation about the central axis of the channel and edges of the partial cylinder, which are circumferentially spaced apart from each other, can move into interfering relation between the port and the channel to partially block and meter flow therebetween.

3 Claims, 2 Drawing Sheets

VALVE WITH CYLINDRICAL METERING DEVICE

BACKGROUND OF THE INVENTION

1. Field of the Invention

The present invention relates generally to valves and, more particularly, to a valve which disposes a partially cylindrical metering device in coaxial association with a fluid conduit and provides a means for rotating the partial cylinder about its centerline to regulate the flow of fluid between a cavity, such as the fluid conduit, and an inlet port.

2. Description of the Prior Art

In conventional valve applications, the metering of a fluid flow out of a valve port is accomplished by including a threaded metering stem within the port passageway. The degree of metering in an application of this type is generally accomplished by turning the metering stem. A disadvantage of this type of application is that a substantial increase in the size of the valve is usually required to accommodate the necessary stem travel that must be provided and, in addition, special piping requirements are generally needed.

SUMMARY OF THE INVENTION

The present invention provides a valve in which a fluid channel is disposed within the valve body and a port is connected in fluid communication with the fluid channel and with a location external to the valve body. A throttle member is shaped to form a partial cylinder and provided with a plurality of deformations in its surface. The throttle member is rotatable about a central axis of the partial cylinder. A threaded member having a thread formed therein is provided and rotatably associated with the valve body. The threaded member is rotatable about a central axis of the threaded member and the thread is disposed in mesh relation within at least one of the plurality of deformations. The throttle member is selectively movable into blocking relation between the port and the fluid channel in response to rotation of the threaded member.

The present invention provides a compact and inexpensive means for metering fluid flow in a valve. It comprises a thin band of material, called a shutter or throttle member, that is inserted into a bore of a valve to be movable into blocking association with a flow passage, such as the flow passage between the fluid channel and a port passageway connecting the channel with a location external to the valve body. In certain applications of the present invention, the valve can be a spool valve and a spool member can be disposed in the fluid channel. However, it should be clearly understood that the present invention is not limited to use with a spool valve. Instead, it can be used in association with any type of fluid control device which regulates fluid flow from one fluid passage to another. The throttle member is a partial cylinder with two edges circumferentially spaced apart from each other. A plurality of deformations are formed within the body of the partial cylinder. The deformations are located within a central portion of the throttle member and do not extend completely to the circumferentially spaced edges. This arrangement serves two important purposes. First, the lack of deformations at the ends of the shutter prevent it from being turned excessively toward either extreme end of travel. Secondly, the absence of deformations near the portions of the shutter that are intended to block flow between the channel and the port leave those portions in a solid configuration to enhance their flow blocking capability. The deformations can be slots in a preferred embodiment of the present invention. The slots are slightly angled and spaced to mesh with the thread of the threaded member which is associated in a generally perpendicular relationship with the central axis of the bore. The threaded member operates in a manner similar to a worm gear assembly. A retaining means, such as a screw, can be used in association with the present invention to prevent axial movement of the threaded member relative to the valve body during rotation of the threaded member. By remaining stationary in the direction along its central axis, the threaded member is able to cause the throttle member to rotate about its axis in response to rotation of the threaded member. When the threaded member is rotated, the thread engagement between the threaded member and the throttle member deformations causes the throttle member to rotate about its centerline and move into or out of blocking association with the interface between the channel and the port.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
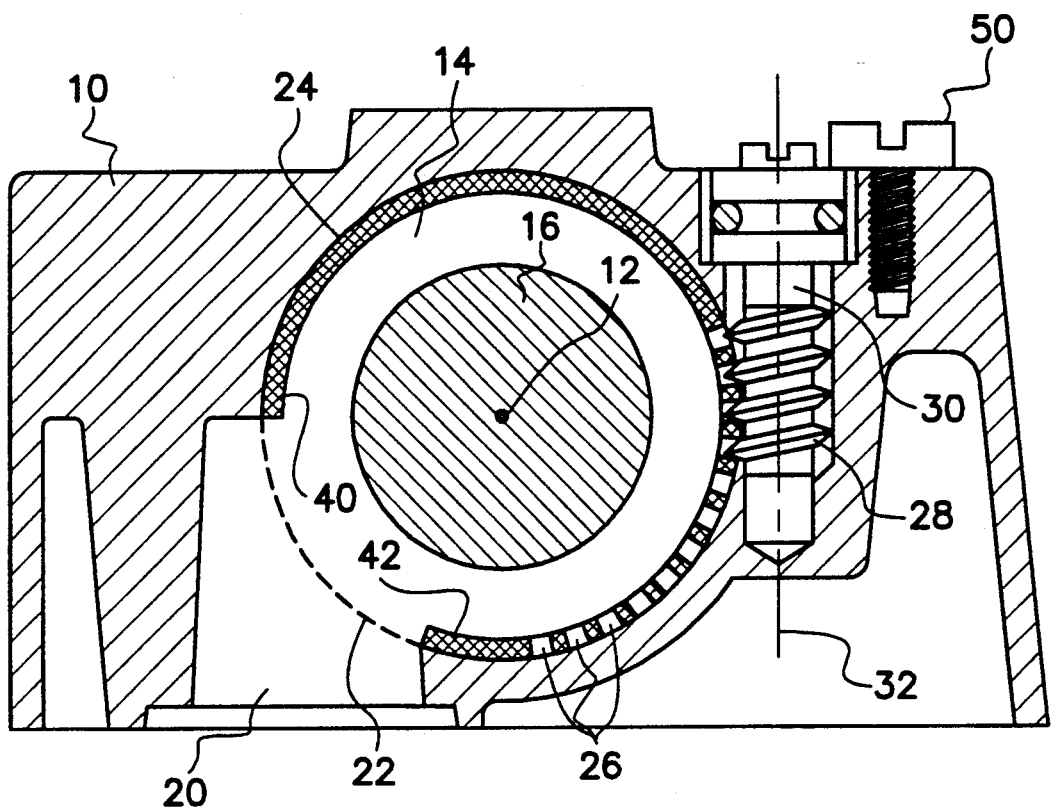
FIG. 1 is a sectional view of a valve incorporating the present invention.

Throughout the Description of the Preferred Embodiment, like components will be identified by like reference numerals. Although the present invention is not limited for use with a spool valve, a preferred embodiment of the present invention will be described and illustrated below in an application associated with a spool valve.

In FIG. 1, a valve body 10 is provided with a spool member 16 which has a central axis 12 and which is disposed within a first channel 14 formed within the valve body 10. A port 20 is connected in fluid communication with the channel 14 to permit fluid to pass through an interface region represented by dashed line 22.

A throttle member 24 is disposed within opening 14 and arranged in coaxial association with axis 12. As can be seen in FIG. 1, the throttle member 24 is a partial cylinder having a plurality of deformations, such as slots 26, formed in its surface. The slots are shaped to receive a thread 28 of a threaded member 30 in mesh relation as shown. The arrangement of the threaded member 30 in conjunction with the slots 26 causes the throttle member 24 to rotate about central axis 12 when the threaded member is rotated about its central axis 32. This arrangement is generally similar in operation to a worm gear.

With continued reference to FIG. 1, it can be seen that the throttle member 24 has two ends, 40 and 42, which are circumferentially spaced apart. It can also be seen that rotation of the throttle member 24 about central axis 12, in response to rotation of the threaded member 30 about central axis 32, will result in one of the ends of the throttle member 24 moving into blocking association with the interface between port 20 and channel 14. In this manner, rotation of the throttle member 24 can be used to affect the flow of fluid across the interface represented by dashed line 22 and the flow of fluid through the valve can be appropriately controlled.

Figure 2:
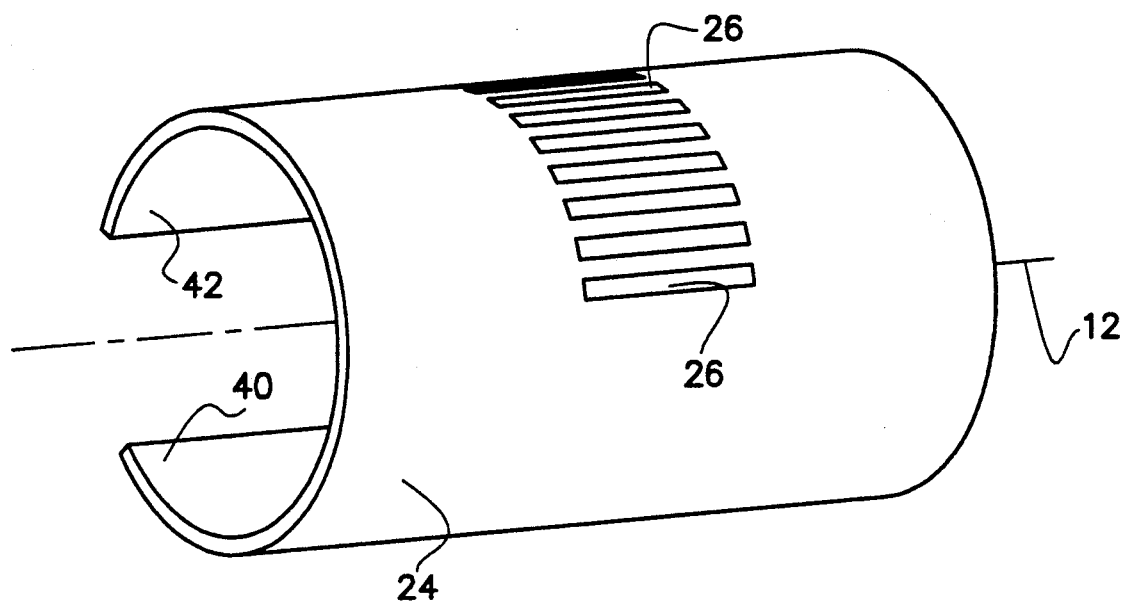
FIG. 2 is a perspective illustration of a throttle member made in accordance with the present invention.

FIG. 2 is a perspective view of the throttle member 24. A plurality of slots 26 are provided in the surface of the throttle member 24. The slots 26, or other similar types of deformations, can be slanted to accommodate receipt of the thread 28 of the threaded member 30. The slots 26 do not extend completely around the circumference of the partial cylinder. Instead, they are absent from the areas most proximate the edges, 40 and 42, of the throttle member 24. The absence of slots near the edges of the throttle member 24 prevent the throttle member from being overrotated and, in addition, provide a solid surface that is capable of blocking flow across dashed line 22 between the port 20 and channel 14. Central axis 12 is shown in FIG. 2 and can serve as the center of rotation of the throttle member 24 and is also the center of the channel 14. However, it should be understood that the center of rotation of the throttle member 24 does not have to be coincident with the central axis 12.

Although the present invention has been described in significant detail and illustrated to show a preferred embodiment of the present invention, it should be understood that alternative embodiments of the present invention are within its scope.

The embodiments of the invention in which an exclusive property or right is claimed are defined as follows:

1. A valve, comprising:
   a fluid channel disposed within a valve body;
   a port connecting said fluid channel in fluid communication with a location external to said valve body;
   a throttle member shaped to form a partial cylinder, said throttle member having a plurality of deformations in its surface, said throttle member being rotatable about a central axis of said partial cylinder;
   a threaded member having a thread formed therein, said threaded member being rotatable about a central axis of said threaded member, said thread being disposed within at least one of said plurality of deformations, said throttle member being selectively movable into blocking relation between said port and said fluid channel in response to rotation of said threaded member; and
   a spool member disposed within said valve body, said spool member being disposed in coaxial and concentric relation with said throttle member.

2. A valve, comprising:
   a valve body;
   a first fluid channel disposed within said valve body;
   a second fluid channel connected in fluid communication with said first channel and extending from said first fluid channel to a location external to said valve body;
   a partially cylindrical throttle member disposed in coaxial association with said first fluid channel, said throttle member being rotatable about a first central axis to selectively permit and prevent fluid communication between said first and second channels;
   a spool member disposed within said valve body, said spool member being disposed in coaxial and concentric relation with said throttle member; and
   means for causing said throttle member to rotate about said first central axis, said causing means comprising a threaded member having a thread disposed in engagement with at least one discontinuity formed in said throttle member, said threaded member being rotatable about a second central axis, said first and second central axes extending in perpendicular directions relative to one another.

3. A valve, comprising:
   a cylindrical fluid channel disposed within a valve body;
   a port connecting said cylindrical fluid channel in fluid communication with a location external to said valve body;
   a throttle member shaped to form a partial cylinder, said throttle member having a plurality of deformations in its surface, said throttle member being rotatable about a central axis of said partial cylinder;
   a spool member disposed within said valve body, said spool member being disposed in coaxial and concentric relation with said throttle member;
   a threaded member having a thread formed therein, said threaded member being rotatable about a central axis of said threaded member, said thread being disposed within at least one of said plurality of deformations, said throttle member being selectively movable into blocking relation between said port and said fluid channel in response to rotation of said threaded member; and
   means for preventing axial movement of said threaded member relative to said valve body, said cylindrical fluid channel being disposed in coaxial relation with said throttle member.

* * * * *